(12) United States Patent
Doron et al.

(10) Patent No.: US 9,386,085 B2
(45) Date of Patent: Jul. 5, 2016

(54) TECHNIQUES FOR PROVIDING SCALABLE APPLICATION DELIVERY CONTROLLER SERVICES

(71) Applicant: Radware, Ltd., Tel Aviv (IL)

(72) Inventors: Ehud Doron, Moddi'in (IL); Masato Sekiguchi, Kanagawa (JP)

(73) Assignee: Radware, Ltd., Tel Aviv (IL)

( * ) Notice: Subject to any disclaimer, the term of this patent is extended or adjusted under 35 U.S.C. 154(b) by 561 days.

(21) Appl. No.: 13/856,679

(22) Filed: Apr. 4, 2013

(65) Prior Publication Data

US 2013/0268646 A1 Oct. 10, 2013

Related U.S. Application Data

(60) Provisional application No. 61/620,131, filed on Apr. 4, 2012.

(51) Int. Cl.
*G06F 15/173* (2006.01)
*H04L 29/08* (2006.01)

(52) U.S. Cl.
CPC ........ *H04L 67/1002* (2013.01); *H04L 67/1023* (2013.01)

(58) Field of Classification Search
CPC .................. H04L 67/1023; H04L 67/1002
USPC .............. 709/223, 224, 226, 229, 232, 238; 718/1
See application file for complete search history.

(56) References Cited

U.S. PATENT DOCUMENTS

| | | | | |
|---|---|---|---|---|
| 7,203,744 B1* | 4/2007 | Parekh | ................ | H04L 41/0893 709/223 |
| 8,873,375 B2* | 10/2014 | Kim | ..................... | G06F 11/203 370/218 |
| 8,958,293 B1* | 2/2015 | Anderson | ........... | H04L 67/1002 370/230 |
| 2004/0215756 A1* | 10/2004 | VanAntwerp | ........... | A63F 13/12 709/223 |
| 2007/0079308 A1* | 4/2007 | Chiaramonte | ........ | G06F 9/5077 718/1 |
| 2009/0228883 A1* | 9/2009 | Gebhart | .............. | G06F 9/45533 718/1 |
| 2011/0277026 A1 | 11/2011 | Agarwal et al. | | |
| 2012/0151353 A1* | 6/2012 | Joanny | ................ | H04L 29/0899 715/735 |
| 2012/0151358 A1* | 6/2012 | Joanny | .................. | G06F 9/5011 715/736 |
| 2012/0226810 A1* | 9/2012 | Ferdman | ............... | G06F 9/5077 709/226 |
| 2013/0055010 A1 | 2/2013 | Kotha et al. | | |
| 2013/0060940 A1 | 3/2013 | Koponen et al. | | |
| 2013/0070762 A1 | 3/2013 | Adams et al. | | |

FOREIGN PATENT DOCUMENTS

WO   WO 2007147310 A1 * 12/2007 ............. H04L 12/66

* cited by examiner

*Primary Examiner* — Oanh Duong
(74) *Attorney, Agent, or Firm* — M&B IP Analysts, LLC

(57) ABSTRACT

A method for managing an application delivery controller (ADC) cluster operable in a software defined networking (SDN)-based network and including a plurality of ADC virtual appliances (VAs). The method comprises creating, by a central controller, a hash table including a plurality of buckets allocated to active VAs out of the plurality of VAs, each bucket is assigned to a range of a source internet protocol (IP) addresses of a client; and programming by the central controller at least one ingress network element connected to the ADC cluster and receive incoming traffic from clients to perform a balanced incoming traffic distribution among the plurality of VAs, wherein the traffic distribution is based in part on the allocation of the buckets to the plurality of VAs and the SIP addresses of the clients originating the incoming traffic. The plurality of VAs are virtual ADC instances operable i the plurality of physical devices.

26 Claims, 5 Drawing Sheets

410

| Bucket Number | SIP | |
|---|---|---|
| 1 | X.X.X.01 | VA 400-1 |
| 2 | X.X.X.02 | VA 400-1 |
| 3 | X.X.X.03 | VA 400-1 |
| 4 | X.X.X.04 | VA 400-1 |
| 5 | X.X.X.05 | VA 400-1 |
| 6 | X.X.X.06 | VA 400-1 |
| 7 | X.X.X.07 | VA 400-1 |
| 8 | X.X.X.08 | VA 400-2 |
| 9 | X.X.X.09 | VA 400-2 |
| 10 | X.X.X.10 | VA 400-2 |
| 11 | X.X.X.11 | VA 400-2 |
| 12 | X.X.X.12 | VA 400-2 |
| 13 | X.X.X.13 | VA 400-2 |
| 14 | X.X.X.14 | VA 400-2 |
| 15 | X.X.X.15 | VA 400-3 |
| 16 | X.X.X.16 | VA 400-3 |
| 17 | X.X.X.17 | VA 400-3 |
| 18 | X.X.X.18 | VA 400-3 |
| 19 | X.X.X.19 | VA 400-3 |
| 20 | X.X.X.20 | VA 400-3 |
| 21 | X.X.X.21 | VA 400-4 |
| 22 | X.X.X.22 | VA 400-4 |
| 23 | X.X.X.23 | VA 400-4 |
| 24 | X.X.X.24 | VA 400-4 |
| 25 | X.X.X.25 | VA 400-4 |
| 26 | X.X.X.26 | VA 400-4 |
| 27 | X.X.X.27 | VA 400-5 |
| 28 | X.X.X.28 | VA 400-5 |
| 29 | X.X.X.29 | VA 400-5 |
| 30 | X.X.X.30 | VA 400-5 |
| 31 | X.X.X.31 | VA 400-5 |
| 32 | X.X.X.32 | VA 400-5 |

| Bucket Number | SIP | |
|---|---|---|
| 1 | X.X.X.01 | VA 400-1 |
| 2 | X.X.X.02 | VA 400-1 |
| 3 | X.X.X.03 | VA 400-1 |
| 4 | X.X.X.04 | VA 400-1 |
| 5 | X.X.X.05 | VA 400-1 |
| 6 | X.X.X.06 | VA 400-1 |
| 7 | X.X.X.07 | VA 400-6 |
| 8 | X.X.X.08 | VA 400-2 |
| 9 | X.X.X.09 | VA 400-2 |
| 10 | X.X.X.10 | VA 400-2 |
| 11 | X.X.X.11 | VA 400-2 |
| 12 | X.X.X.12 | VA 400-2 |
| 13 | X.X.X.13 | VA 400-2 |
| 14 | X.X.X.14 | VA 400-6 |
| 15 | X.X.X.15 | VA 400-3 |
| 16 | X.X.X.16 | VA 400-3 |
| 17 | X.X.X.17 | VA 400-3 |
| 18 | X.X.X.18 | VA 400-3 |
| 19 | X.X.X.19 | VA 400-3 |
| 20 | X.X.X.20 | VA 400-6 |
| 21 | X.X.X.21 | VA 400-4 |
| 22 | X.X.X.22 | VA 400-4 |
| 23 | X.X.X.23 | VA 400-4 |
| 24 | X.X.X.24 | VA 400-4 |
| 25 | X.X.X.25 | VA 400-4 |
| 26 | X.X.X.26 | VA 400-6 |
| 27 | X.X.X.27 | VA 400-5 |
| 28 | X.X.X.28 | VA 400-5 |
| 29 | X.X.X.29 | VA 400-5 |
| 30 | X.X.X.30 | VA 400-5 |
| 31 | X.X.X.31 | VA 400-5 |
| 32 | X.X.X.32 | VA 400-6 |

FIG. 4B

TECHNIQUES FOR PROVIDING SCALABLE APPLICATION DELIVERY CONTROLLER SERVICES

CROSS-REFERENCE TO RELATED APPLICATIONS

This application claims the benefit of U.S. provisional application No. 61/620,131 filed on Apr. 4, 2012, the contents of which are herein incorporated by reference.

TECHNICAL FIELD

The invention generally relates to service providers networking environments, and more particularly to techniques for dynamically changing the utilization of ADC services in such environments.

BACKGROUND

Cloud-computing and cloud-based services occupy a fast growing slice of the market. One of the main benefits of the cloud service is being able to "consume exactly what you need", i.e., services are consumed on demand. As a result, there is no need to purchase dedicated IT infrastructure (e.g., servers, network devices, and storage) sized for the maximum foreseeable utilization, which will still incur fixed operational expenses in addition to the initial capital expenditures for the equipment, but will be idle for most of the time.

One of the common cloud business models is payment for the actual utilization of computing resources at each point in time (as known as "pay as you go"). In implementation, the number of virtual machines (VMs) that are actually in use, their computing capacity (memory, CPU, and the like), and the volume of traffic flowing between the "cloud" and the outside world (WAN/Internet) is measured to determine the utilization of computing resources to ascertain the actual cost for the customers.

The main requirements in such services are a large number of concurrent tenants, and providing, for each tenant, high variability in the required capacity, i.e., between different services and especially within the same service at different points in time. Tenants are customers that deploy services in the same cloud. For example, a service that deals with last-minute sales or events at specific points in time requires very high capacity at peak times, and almost zero resources at other times.

As a consequence, such cloud services must be highly scalable and dynamically adaptive to match the requirements of all cloud-customers at any given point in time, as the resources per each cloud-customer are allocated to fit the actual and current needs of the tenant. The combination of these requirements is also known as elasticity.

One of the computing resources utilized in datacenters, and hence in cloud-computing environments, is an application delivery controller (ADC). An ADC is a network device installed in a datacenter or multi-datacenter system to remove load from web servers in the datacenter. That is, an ADC typically distributes clients' requests between the web servers in a datacenter to balance the load. In a multi-datacenter system, an ADC is deployed in each datacenter to redirect clients' requests to a datacenter that would best serve such requests. Typically, the redirection decision is based on the location of the client from the datacenter. The ADC is a network device and as such, includes computing resources, such as memory, one or more central processing units (CPU), storage, network connectivity, and so on.

Virtual instances of an ADC device can improve the performance of datacenters and reduce costs and overhead to the service providers. Similar to any other data center application, the ADC devices of different customers or applications can be consolidated as multiple virtual ADC instances running on a single hardware device.

Although virtual ADC provides flexibility in terms of the number of virtual instances, as well as computing resources that can be allocated or de-allocated within a physical device to provide ADC services, the capacity of a virtual ADC is typically limited by the computing resources of the physical device hosting the virtual instances. The computing resources include computing power (e.g., number of CPU cores), bandwidth, memory, and the like.

In order to increase the capacity when providing ADC services, prior art solutions suggest clustering a number of physical ADC devices. An exemplary diagram of such a cluster 100 is provided in FIG. 1. In this example, three physical ADC devices 110, 111, and 112 are connected to a client network through a switch 120, and to the server network (in the datacenter) through a switch 130. The cluster illustrated in FIG. 1 requires a backplane switch 140 to allow communication between all the devices 110-112. The switches 120, 130, and 140 are standard network switches. The traffic distribution in the cluster 100 is performed based on link aggregation (LAG) provisioning of the switches 120 and 130.

The cluster 100 suffers from a number of limitations, one of which is that all ADC devices 110-112 should have the same capacity. Another limitation is that any change to the initial configuration of the cluster 100 requires implementing an ADC persistence correction process using the backplane switch 140, which is mainly added for this purpose. Furthermore, any ADC device added to the initial cluster must be connected to the backplane switch 140 and any traffic routed to such an ADC device must first pass through any of the ADC devices 110-112. This is performed in order to comply with the initial LAG distribution function with which the cluster is configured. Yet another limitation of the cluster 100 is that the switches 120, 130 and 140 should be physically co-located near to the ADC devices 110-112.

As a result of the limitations of conventional ADC clustering techniques, current solutions cannot efficiently support elasticity of ADC services. That is, the cluster 100 may not be dynamically adapted to provide additional or less capacity for ADC services on-demand. In cloud-computing environments, high availability and elasticity of the supplied services are essential.

In attempt to cure such a deficiency, a DNS-based elasticity technique can be utilized. In such a technique, a DNS is utilized to distribute the load among the ADC devices in the cluster. However, this technique also suffers from some drawbacks, including for example, poor adaptability, performance, and latency. The poor adaptability results from the fact that DNS responses are cached and it takes a long time to respond to changes in the cluster configuration. Thus, an ADC may become overloaded or completely unavailable in the interim since the last time the DNS server returned its IP address to the client. Trying to solve the poor adaptability issue by setting the time-to-live (TTL), would create a performance bottleneck around the DNS server due to the ensuing flood of requests and also requires more computing capacity. An attempt to solve the performance issue would increase the latency per connection setup, because of the DNS roundtrip prior to the connection setup.

Therefore, the conventional ADC clustering techniques are not optimized for cloud-computing environments and for providing elasticity in ADC services.

SUMMARY

Certain embodiments disclosed herein include a method for managing an application delivery controller (ADC) cluster in a software defined networking (SDN)-based network. The method is performed by a central controller of the SDN-based network, the ADC cluster includes a plurality of physical devices, each of the plurality of physical devices includes a plurality of ADC virtual appliances (VAs). The method comprises creating, by the central controller, a hash table including a plurality of buckets allocated to active VAs out of the plurality of VAs, wherein each bucket is assigned to a range of a source internet protocol (IP) addresses of a client; and programming by the central controller at least one ingress network element, connected to the ADC cluster and configured to receive incoming traffic from clients, to perform a balanced incoming traffic distribution among the plurality of VAs, wherein the traffic distribution is based in part on the allocation of the buckets to the plurality of VAs and the SIP addresses of the clients originating the incoming traffic.

Certain embodiments disclosed herein also include a method for managing an application delivery controller (ADC) cluster including a plurality of ADC devices and operable in a software defined networking (SDN)-based network, wherein the method is performed by a central controller of the SDN-based network. The method comprises creating, by the central controller, a hash function including a plurality of buckets allocated for the plurality of ADC devices, wherein each bucket is assigned for a range of source internet protocol (IP) addresses of a client; monitoring at least one of a processing load of the ADC cluster and an operation status of each of the ADC device; causing to reconfiguration of the ADC cluster in response to the monitoring, wherein the reconfiguration of the ADC cluster includes at least one of: adding an ADC device or removing and ADC device, and updating the hash table; and programming by the central controller at least one ingress network element connected to the ADC cluster to perform balanced traffic distribution among the plurality of ADC devices, wherein the traffic distribution is based in part on the allocation of the bucket to the plurality of ADC devices and SIP addresses of clients originating the traffic.

Certain embodiments disclosed herein also include a central controller for managing an application delivery controller (ADC) cluster in a software defined networking (SDN)-based network. The central controller comprises a cluster management module for creating, by the central controller, a hash table including a plurality of buckets allocated to active VAs out of the plurality of VAs, wherein each bucket is assigned to a range of a source Internet protocol (IP) addresses of a client; and a network-interface module for instructing the least one ingress network element connected to the ADC cluster to perform a balanced traffic distribution among the active VAs, wherein the traffic distribution is based in part on the allocation of the buckets to the active VAs and the SIP addresses of clients originating the traffic.

BRIEF DESCRIPTION OF THE DRAWINGS

Various embodiments are particularly pointed out and distinctly claimed in the claims at the conclusion of the specification. The foregoing and other objects, features, and advantages of the invention will be apparent from the following detailed description taken in conjunction with the accompanying drawings.

FIGS. 4A and 4B are exemplary hash tables generated according to one embodiment.

DETAILED DESCRIPTION

Figure 1:
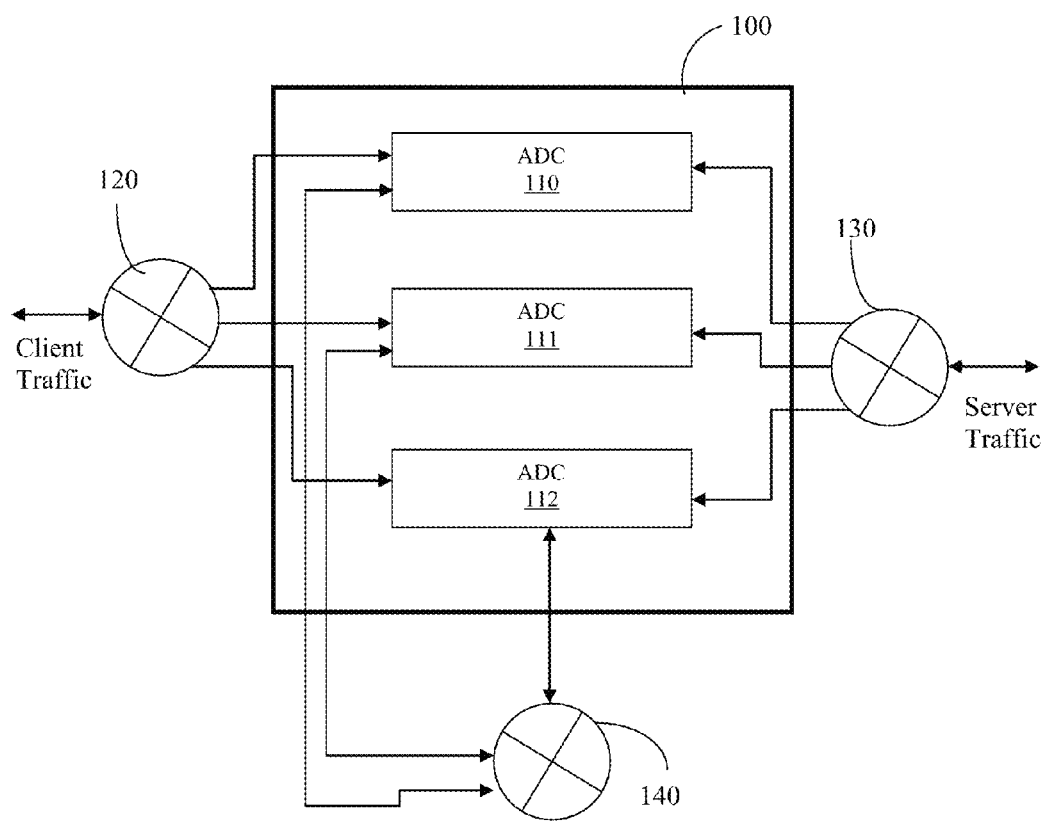
FIG. 1 is a diagram illustrating a conventional ADC clustering solution.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Various embodiments disclosed herein include techniques for clustering, controlling, and managing ADC devices for the purpose of achieving elasticity, scalability, and high availability of ADC services. Such services include, but are not limited to, load balancing (LB), acceleration, and other application delivery functions. In one embodiment, these ADC services may be provided to a single virtual IP (VIP) on a specific port using multiple instances of elementary ADC units.

In one embodiment, the elasticity is realized by dynamically adapting the number of ADC units utilized to provide the requested ADC services capacity and elasticity. In an exemplary embodiment, an elementary ADC unit may include a physical ADC device, a virtual ADC (a virtualized form-factor of an ADC device), or an ADC process executed over a physical computing device (e.g., a server). An example for an implementation of a virtual ADC can be found in U.S. patent application Ser. No. 13/405,816 to Ferdman, et al., which is assigned to common assignee and the contents of which are herein incorporated by reference. The virtual ADC, the physical ADC device and the ADC process are referred to hereinafter to as a "virtual appliance" or VA.

In addition to the ability to control the number of active VAs in the cluster, a method for balanced distribution of the clients' traffic among all the VAs in the cluster is disclosed. It should be noted that the embodiments disclosed herein are equally applicable for all the VAs types mentioned above.

Figure 2:
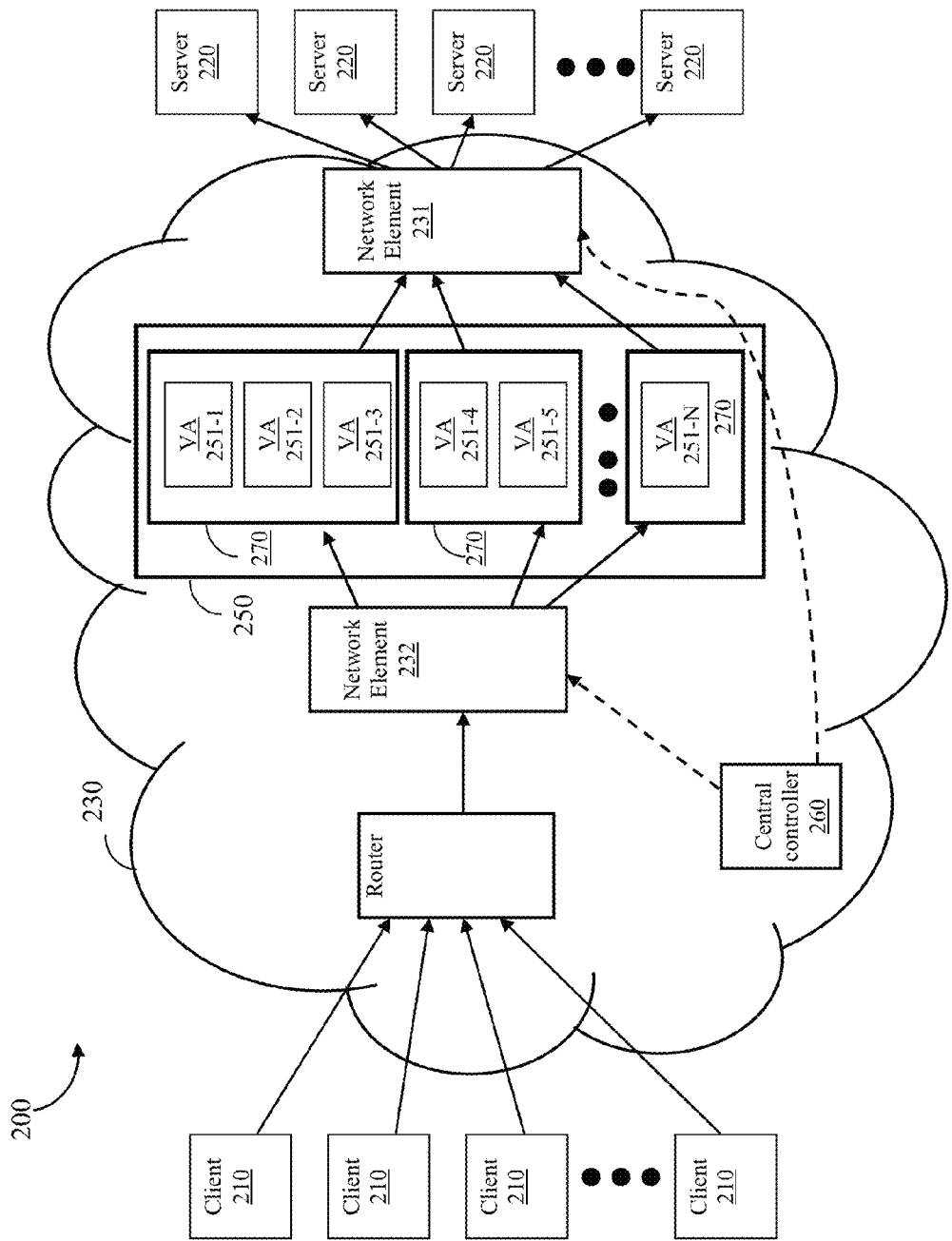
FIG. 2 is a diagram of a network system utilized to describe various embodiments of the invention.

FIG. 2 shows an exemplary and non-limiting a network system 200 utilized to describe various embodiments disclosed herein. In the network system 200 a plurality of clients 210 receive services from a plurality of servers 220. The clients 210 and servers 220 are communicatively connected through a network 230. The network 230 may be a software defined networking (SDN) based network or a combination of a standard IP network and SDN-based network.

The SDN is a networking architecture that provides centralized management of network elements. In the SDN, a network element follows networking operations, such as routing decisions, received from a central controller. The SDN can be implemented in wide area networks (WANs), local area networks (LANs), the Internet, metropolitan area networks (MANs), internet service provider (ISP) backbones, datacenters, and the like. A SDN-based network element is typically a switch that routes traffic according to the control of a central controller. The SDN may also include "standard" routers, switches, bridges, load balancers, and so on, as well as any virtual instantiations thereof.

The network 230 may be also a combination of a standard IP network that includes conventional routers and switches with SDN-based network elements controlled by a central controller. To allow the proper operation of the disclosed techniques in a hybrid network, at least one network element being programmable by the central controller should be connected to an ADC cluster 250.

The servers 220 are connected to the ADC cluster 250 through a network element 231 (which is referred to as an egress network element or a server-side network element). The ADC cluster 250 receives clients' traffic through a network element 232 (which is referred to as an ingress network element or a client-side network element). The ADC cluster 250 is configured according to various embodiments disclosed herein and includes a plurality of VAs 251-1 through 251-N. The VAs 251 are hosted in physical devices 270. A device 270 may a generic physical machine (e.g., a server) or a physical ADC. It should be noted that the devices 270 in the cluster 250 may have different capacities and the VAs may be configured with different capacities.

The VAs 251 distribute the load among the servers 220, and can perform additional service delivery tasks, such as SSL offloading, content-based routing, connection pooling, and the like. The ADC cluster 250 is addressed by MAC and IP addresses. In one embodiment, a single virtual service is provided by the ADC cluster 250. With this aim, a single VIP is utilized for the purpose of communication with the VAs 251 in the cluster 250. That is, the clients 210 can direct a request to a single VIP.

According to one embodiment, a central controller 260 dynamically controls and manages the configuration of the ADC cluster 250. This includes adding and removing VA instances and/or devices 270 based on the current load of the devices 270. In one embodiment, the controller 260 monitors the health of VAs 251 and devices 270 to determine their operational status, i.e., up and down. Based on the determined operational mode the controller 260 maintains a list of active ADCs (VAs and devices). In a case of a failure in one VA or device, the controller 260 switches over to a different VA or device by migrating its current state and connections as well as managing the traffic distribution in the new cluster configuration. Various techniques for monitoring the health or load of VAs 251 are disclosed below.

According to another embodiment, the central controller 260 implements the traffic distribution process to balance the incoming traffic load among all the VAs 251 in any configuration of the ADC cluster 250. The traffic distribution process ensures that a balanced traffic distribution is achieved when VAs 251 and/or devices 270 are added to or removed from the ACD cluster 250. The traffic distribution is performed using a hash table implementation discussed in greater detail below.

In one configuration, the network elements 231, 232, and the central controller 260 are SDN-based components. In such a configuration, the network elements 231 and 232 communicate with the central controller 260 using, for example, an OpenFlow protocol. The OpenFlow protocol allows adding programmability to network elements 231 and 232 for the purpose of packets-processing operations under the control of the controller 260, thereby allowing the central controller to define the traffic handling decisions in the network element. As will be discussed below, the controller 260 programs the network elements 231 and 232 to allow a customized traffic distribution with connection persistency. That is, all the packets of a single connection are eventually handled by the same VA and consequently by the same server, all at wire speed.

The protocols between the clients 210 and server 220 can be any client-server protocol, for example, Web servers using the HTTP protocol.

It should be noted that, in one embodiment, the infrastructure of the system 200 can be completely virtualized for both the servers 220 and devices 270. The server's environment is virtualized using one or more VMs. As noted above, a device 270 can also execute one or more virtual ADCs instances, i.e., VAs 251.

According to another embodiment, the infrastructure of the system 200 is of a service provider physical network. In such configuration, the ADC cluster 250 can be built to include physical ADC devices without any virtual ADCs instances. The ADC cluster 250, in this embodiment, can be utilized to provide high capacity ADC services by aggregation of a plurality of ADC devices.

The following is a non-limiting example for a traffic flow in the network system 200. An incoming packet from a client 210 is received at the network element 232. The network element is programmed by the central controller 260 to pass the incoming packet to a destination VA, e.g., VA 251-3 according to the source IP address (i.e., the client's 210 IP address). The destination VA is selected, in part, using the hash table discussed below. The VA (e.g., 251-3) sends the request to one of servers 220 based on the ADC service it is configured to execute.

In the opposite direction, an outgoing packet sent by a server 220 (e.g., a server response) must arrive at the same VA (e.g., VA 251-3) that handled the client's incoming packet. With this aim, in one embodiment, a source network address translation (NAT) is utilized by the destination VA (e.g., VA 251-3) to translate the client IP address to its own IP address, thereby enabling subsequent responses to arrive at the VA's IP address. In another embodiment, discussed in detail below, a hash function is performed on the destination IP address (included in response packets), which is the IP address of a client 210.

In one embodiment, the central controller 260 programs the ingress network element 232 to send incoming packets from a client 210 to one of the VAs 251 (e.g., VA 251-1) based on the client's source IP address. The central controller 260 also programs the egress network element 231 to send outgoing packets from server 220 to the VA 251 that forwarded the respective incoming packet.

The central controller 260 programs the network elements to implement the hash table operations used for clients' traffic distribution among VAs 251. In addition, the controller 260 performs health checks to make sure the VAs are functional. One or more VAs 251 found to be down are removed from the flows and no traffic is redirected to the such VAs.

As noted above, the traffic distribution process performed by the central controller 260 determinates and selects, using a hash table implementation, the destination VA 251 based on the client's IP address. This guarantees that the traffic from the same client always arrives at the same VA instance. However, persistency must also be preserved in the presence of changes in the set of VAs 251 in the ADC cluster 250. That is, the persistency must be maintained when adding a new VA or removing a VA that was either planned due to, for example, a user request or unplanned due to failure. According the disclosed embodiments, the persistency is guaranteed in the event of changes to the cluster 250, by configuring the VAs 251 with persistency rules. Examples for such rules are provided below.

Figure 3:
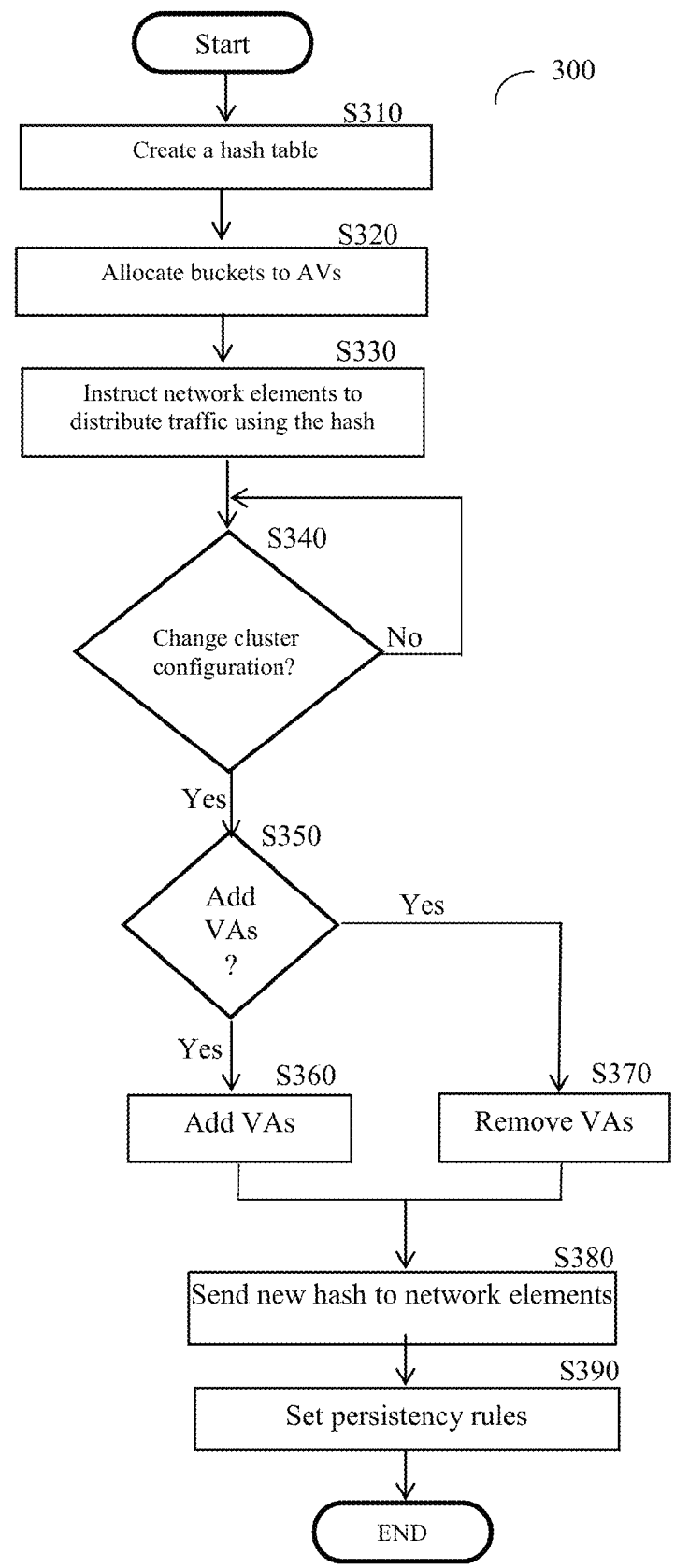
FIG. 3 is a flowchart illustrating the process for controlling and managing an ADC cluster according to one embodiment.

FIG. 3 shows an exemplary and non-limiting flowchart 300 illustrating the operation of the central controller 260 according to one embodiment. The controller 260 manages and controls the ADC cluster 250 as well as programs the network elements 231 and 232 with the traffic distribution process for a balanced distributing clients' traffic between active VAs 251 in the ADC cluster 250. The capacity of the VAs 251 and devices 270 may be different from each other.

At S310, a hash table is created to allow implementation of the hash operations by the network elements 232 and 231. The hash table includes a number of N buckets, each bucket relates to a range of source IP addresses, i.e., IP addresses of the clients 210. In order to achieve balanced traffic distribution in any load conditions, the number of buckets in the hash table is a multiplication of the maximum number of active VAs (Nmax) that can be supported in the cluster 250. In addition, M is a power of 2. In an exemplary embodiment, the number of buckets (M) is 8 times the number Nmax. For example, the hash table includes 256 buckets for Nmax equals to 32.

At S320, the buckets in the hash table are allocated to VAs 251, where each bucket is allocated to one specified active VA. The allocation is performed proportionally to the number of active VAs 251 and their capacity.

In one embodiment, when all devices 270 have equal capacity, the allocation buckets to each active VA is computed by dividing the total number of buckets by the number of active VAs, truncated to the closest integer. That is, the number of buckets allocated to each VA 251 is computed as follows:

$$\left\lfloor \frac{M}{N} \right\rfloor; \text{ or}$$

$$\left\lfloor \frac{M}{N} \right\rfloor + 1$$

The parameter M is the total number of buckets and N is the number of active VAs.

For example, if M=32 and N=5, then two VAs are allocated with 7 buckets and three VAs with 6 buckets. An exemplary hash table 410 representing such allocation is provided in FIG. 4A.

In another embodiment, the ADC cluster 250 includes one or more non-equal capacity VAs, where the various VA capacities are integer multiplications of the capacity of VA with the lowest capacity, defined as a "basic capacity". The parameter C is a total capacity in terms of multiplications of a basic capacity unit. That is, the number of buckets allocated to each VA 251, can be computed as follows:

$$K \times \left\lfloor \frac{M}{C} \right\rfloor; \text{ or}$$

$$K \times \left\lfloor \frac{M}{C} \right\rfloor + 1$$

where, K is the multiplication of the basic ADC capacity for the specific VA.

For example: 3 VAs are configured to support the following capacity: VA 251-1=20 Giga byte per second (Gbps), VA 251-2=80 Gbps, and VA 251-5=40 Gbps. Accordingly, the capacity unit is 20 Gbps and the VAs capacity units are as follow: VA 251-1=1 VA 251-2=4 and VA 251-5=2, and the total capacity C is C=1+4+2=7. Therefore, VA 251-1 allocated with 5 buckets, VA 251-2 with 17 buckets and VA 251-5 with 10 buckets.

Once the hash table is created, at S330, the controller 260 instructs the network element 232 as to which VA to direct traffic received from a client 210. The instruction includes a matching rule and an action rule. The matching rule requires that a predefined number of lowest bits (or suffix) of the source IP address of the incoming packet (from client 210) is matched against the hash table to find the respective bucket and the allocated VA. For example, referring to the hash table 410 in FIG. 4A, the packet having a source IP (SIP) address x.x.x.1 is directed to a VA 400-1. In an exemplary embodiment, the matching is against the 8 lower bits in the SIP (e.g., '1'). The matching rule provides an implementation of the hash table created by the controller 260. In another embodiment, the controller 260 can provide the network element with the hash table. The action rule ensures that incoming packets reach the designated VA. In one exemplary embodiment this can be accomplished by exchanging the destination MAC address designated in the incoming packet to the MAC address of the selected VA. In another embodiment, the action rule requires encapsulating the incoming packets with a layer 2 or layer 3 (L3 or L2 of the OSI model) parameters towards the designated VA.

Optionally, at S330, the controller 260 also instructs the network element 231 to return the packets returned from a server 250 to the same VA that handles the respective incoming packets. The instruction includes a matching rule and an action rule. The matching rule requires matching a predefined number of lowest bits (or suffix) of the destination IP address of packets received from a server 250 to the hash table to find the respective VA. For example, packets from the server having a destination IP address of 'x.x.x.1' are directed to VA 400-1 according to the exemplary hash table 410. The action rule ensures that outgoing packets reach the designated VA, e.g., by exchanging the MAC addresses. The matching rule provides an implementation of the hash table created by the controller 260.

In order to support elasticity in ADC services, at S340, the controller 260 checks if the configuration of the ADC cluster 250 should be modified to add or remove at least one VA. Such modification may be triggered as a result of a user (e.g., a system administrator) command, for cases of ADC services SLA updates, or based on the load and health monitoring performed by the central controller 260.

According to the disclosed embodiments, the load monitoring includes a check if the current average load of the ADC cluster (hereinafter "ADC load") is above a predefined peak-threshold or below a predefined low-threshold. In an exemplary embodiment, the current processing load is computed as the average CPU (or processor) load of all VAs in the cluster 250. That is, $$\text{Cluster\_Load} = \frac{1}{N} \sum_i VA_i CPULoad$$

where, $VA_i$ CPU Load is the average processing load (e.g., CPU utilization) of a single VA in the cluster 250.

The low-threshold represents low utilization of processing power in the cluster 250, while peak-threshold represents high utilization of processing power in the cluster 250. According to one embodiment, when the Cluster_Load is below the low-threshold at least one VA is removed from the cluster 250 and when the Cluster_Load exceeds the high-threshold at least one VA is added to the cluster 250. The number of VAs to add or remove may be pre-determined by the user or set as a function of the difference between the Cluster_Load and the respective threshold.

If S340 results with an affirmative answer, execution continues with S350; otherwise, execution waits at S340 to continue the monitoring of the ADC cluster. At S350 it is further checked if at least one VA should be added. If so, execution continues with S360 where a process of adding additional VA(s) is performed. Otherwise, at S370, a process of removing additional VA(s) is performed. Both S360 and S370 include modifying the hash table to account for the changes in the configuration in the ADC cluster. It should be noted that instantiation of new VAs or deleting VAs is not performed by the controller 260, but under the control of the controller 260. That is, the central controller 260 instructs a virtual machine manager (not shown) or the physical ADC device to instantiate a new VA or revoke a VA.

In one embodiment, S360 includes changing the buckets' allocation, so that the newly added VAs and other active VAs will be allocated. The number of allocated buckets per VA is determined based on the following functions:

$$\left\lfloor \frac{M}{N+p} \right\rfloor; \text{ or}$$

$$\left\lfloor \frac{M}{N+p} \right\rfloor + 1.$$

The parameter M is the number of buckets, N is the number of current active VAs, and p is the number of the newly added VAs.

As a non-limiting example, the ADC cluster 250 initially include 5 VAs (N=5), where each VA is initially allocated with $$\left\lfloor \frac{M}{N} \right\rfloor \text{ or } \left\lfloor \frac{M}{N} \right\rfloor + 1$$

buckets. When it is required to add single VA to the ADC cluster 250, each VA in the cluster should be allocated with $$\left\lfloor \frac{M}{N+1} \right\rfloor \text{ or } \left\lfloor \frac{M}{N+1} \right\rfloor + 1.$$

That is, only $$\left\lfloor \frac{M}{N+1} \right\rfloor$$

buckets are allocated from existing VAs to the single new added VA. For example, equal ADC capacity in the cluster 250 with a number of VAs N=5. Then, a number of 3 VAs are allocated with 6 buckets and a number of 2 VAs are allocated with 7 buckets. When a new VA is added, the number of active buckets N=6, thus a total number of 5 buckets from the current existing 5 VAs are allocated to the new added VA. Therefore, a number of 4 VAs are allocated with 5 buckets and a number of 2 VAs are allocated with 6 buckets. It should be appreciated that the number of changes to the hash table is bounded by a number equals to $$\left\lfloor \frac{M}{N+1} \right\rfloor.$$

In order to allow minimum changes in bucket allocation, the buckets to be allocated to the newly added VAs are first selected from VAs with extra bucket(s) relative to other VAs. Then, buckets from all other VAs are allocated to the new VA. That is, each VA can potentially contribute one or more buckets to a new added VA, with the constraint to keep on the number of buckets allocated to each VA is as described above. An exemplary hash table 420 showing the new allocation of buckets to a new VA 400-6 is depicted in FIG. 4B. As can be compared to the hash table 410 shown in FIG. 4A, bucket numbers 7, 14, 20, 26 and 32 are now allocated to a new VA 400-6. These buckets are de-allocated from VAs 400-1, 400-2, 400-3, 400-4, and 400-5 respectively.

In one embodiment, S370 includes changing the buckets' allocation, so that the buckets allocated to the deleted VAs, will be allocated to the rest of the active VAs. The number of allocated buckets per active VA is determined based on the following functions:

$$\left\lfloor \frac{M}{N-p} \right\rfloor; \text{ or}$$

$$\left\lfloor \frac{M}{N-p} \right\rfloor + 1$$

The parameter M is the number of buckets, N is the number of current active VAs, and p is the number of the removed (deleted) VAs. The buckets of the deleted VAs are first allocated to VAs without an extra bucket relative to other VAs. Then, remaining buckets from deleted VAs, are allocated to the other active VAs. That is, each VA accepts at least one bucket from the deleted VA(s). The new bucket allocation for fewer VAs is also proportional to the capacity of each active VA.

At S380, the central controller 260 programs to the network element 232, and optionally to element 231 with the modified hash table. This enables the network elements 231 and 232 to direct incoming and outgoing packets based on the modified hash table. At S390, when one or more VAs is added or deleted, VAs 251 affected from the new configuration of the cluster 250 are configured with one or more persistency rules.

In one embodiment, the persistency rules determine that if a VA receives a packet having a source IP address of a bucket previously owned by another VA, then the VA processes this packet only if it belongs to an existing session owned by it (e.g., a session that is not defined in its session table), a new session, or the packet is a "signed packet"; otherwise, the packet is sent to the VA that previously owned the bucket. Similarly, a VA that previously owned a bucket now allocated to a new VA, is configured with a persistency rule to "sign" and send packets that belong to a new session or does not belongs an existing session (e.g., session that not defined in its session table), to the new VA now own the bucket which the source IP address is belonged to. A non-limiting example for signing a packet may include modifying the packet header. The persistency rules are set to expire after a preconfigured time interval. The central controller 260 further informs each relevant VA about the bucket ownership updates.

The persistency rules are further described with reference to FIG. 4B. If a packet addressed with a SIP x.x.x.7 allocated for bucket number 7 arrives at VA 400-6 (which is the new VA), then the VA 400-6 processes the packet and checks if the received packet exists in its session table or if it belongs to a new session. If not, the VA 400-6 forwards the packet to VA 400-1 which owned bucket number 7 before the hash table was modified (see FIG. 4A). If the packet addressed with a SIP x.x.x.7, arrives at VA 400-1, then the VA 400-1 processes that packet only it exists in its session table; otherwise, the VA 400-1 forwards the packet to VA 400-6 which currently owned bucket number 7.

It should be appreciated that the structure of the hash table (i.e., the buckets and their allocation) and hash functions utilized for adapting the allocation, ensures minimal changes to the hash table, hence to the flow mapping. In addition to the structure of the hash table, the persistency rules defined above ensure connection persistency which requires that all packets pertaining to the same layer-4 (of the OSI model) connection will arrive at the same VA instance.

Referring back to FIG. 2, as noted above, the central controller 260 constantly monitors the health condition of the VAs 251, so that only active VAs handle the traffic. The central controller 260 can also initiate checking the health status of the servers 220, enabling the VAs 251 to distribute traffic only among active servers. According to one embodiment, all VAs are required to actively issue address resolution protocol (ARP) requests (or similar requests) to their default gateway for a period of time (e.g., 1 second). The network element 232 forwards the packet to the central controller 260. After the predefined period of time without ARP reception, the controller 260 treats the unresponsive VA as failed. Other health monitoring commands include sending a dedicated health monitoring request from the controller 260 to the VAs in the cluster. Each VA receiving such command reports its overall health condition.

In another embodiment, a passive health monitoring is performed. That is, when a VA stops forwarding traffic towards the client 210 for a predefined period of time (e.g., 1 second), the controller 260 initiates a proactive health check toward that VA. An example of such a health check is an ICMP echo (ping) packet, but other checks should be apparent to one of ordinary skill.

In yet another embodiment, each active VA can be configured to monitor the health condition of a partial group of the servers 220. Each VA reports the condition of the monitored VAs to the controller 260. The controller 260 updates all active VAs 251 with the overall conditions of all servers 220, thereby allowing the VAs to decide to which of the servers 220 packets should be forwarded.

It should be noted that although two network elements 231 or 231 are depicted in FIG. 2, the embodiments disclosed herein can be applied to a plurality of clients and servers communicating through multiple SDN-network elements and native network elements. Furthermore, the devices 270 may not be physically co-located near to the network elements 231 and/or 232. That is, the devices 270 and their VA instances can be distributed in the network 230. Each group of distributed VA instances may be connected to an SDN-based network element, which directs traffic to VAs under the control of the controller 260 as discussed in detail above.

In an exemplary deployment, a single SDN-based network element can handle ingress and egress traffic from a cluster of VAs. In another exemplary deployment, multiple SDN-based network elements can be connected to the input and output of the VAs. The controller 260 creates the same flows on all network elements regardless of the deployment.

The disclosed embodiments can also be utilized for exchanging ADC devices (e.g., devices) in a single operation. Accordingly, a backup ADC device is exchanged with an active ADC device by merely assigning the buckets of the current active ADC device to the backup ADC device. Then, the active ADC can be shut down. The exchange operation may be required, for example, for maintenance purposes.

Figure 5:
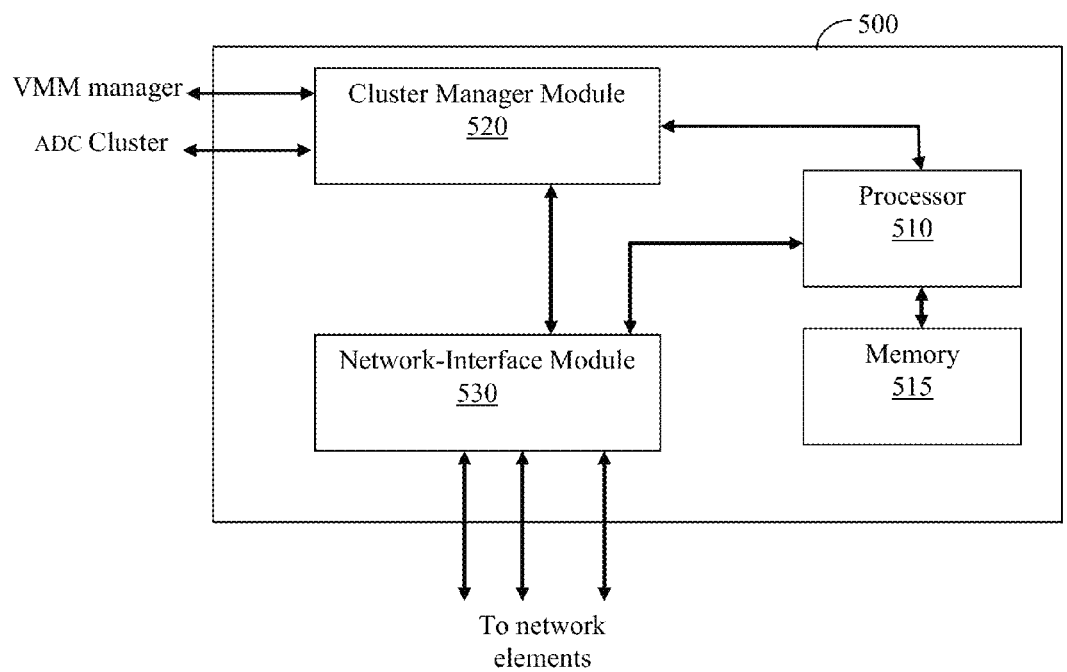
FIG. 5 is a block diagram of the central controller constructed according to one embodiment.

FIG. 5 shows an exemplary and non-limiting block diagram of the central controller 500 constructed according to one embodiment. The central controller 500 is operable in SDN-based networks and networks that are combination of standard IP network and SDN-based network. The controller 500 is configured to at least execute the methods described in greater detail above.

The central controller 500 includes a processor 510 coupled to a memory 515, a cluster manager module 520, and a network-interface module 530. The cluster manager module 520 dynamically controls and manages the configuration of the ADC cluster. With this aim, the module 520 determines if VA instances and/or devices should be added or removed from the cluster based on the current load of the cluster and the operational status of each VA and device in the cluster. In one embodiment, the manager module 520 communicates directly with the devices in the ADC cluster and may also communicate with a virtual machine manager (not shown).

The cluster manager module 520 further preforms the traffic distribution function discussed above. This includes creating of the hash table and updating the table based on the changes in the active ADCs, creating the persistency rules, and generating a set of instructions for the network elements to enable proper selection of the VA.

The network-interface module 530 allows the communication with the network elements that communicate with the ADC cluster. The communication is performed in part to allow the hash function operations by instructing the network elements to select one VA to allow equal traffic distribution in the cluster. In one embodiment, such communication uses, for example, the OpenFlow protocol discussed above, through a secure channel established with each network element.

It should be further noted that the embodiments disclosed herein are not limited to OpenFlow protocol and OpenFlow-based network elements (switches), but can be adapted to support any SDN types of protocols and network elements.

The foregoing detailed description has set forth a few of the many forms that different disclosed embodiments can take. It is intended that the foregoing detailed description be understood as an illustration of selected forms that the invention can take and not as a limitation to the definition of the invention.

Most preferably, the various embodiments discussed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for managing an application delivery controller (ADC) cluster in a software defined networking (SDN)-based network, wherein the method is performed by a central controller of the SDN-based network, the ADC cluster includes a plurality of physical devices, each of the plurality of physical devices includes a plurality of ADC virtual appliances (VAs), comprising:
  creating, by the central controller, a hash table including a plurality of buckets allocated to active VAs out of the plurality of VAs, wherein each of the buckets is assigned to a range of a source internet protocol (IP) addresses of a client; and
  programming by the central controller at least one ingress network element, connected to the ADC cluster and configured to receive incoming traffic from clients, to perform a balanced incoming traffic distribution among the plurality of VAs, wherein the traffic distribution is based in part on the allocation of the buckets to the plurality of VAs and the source IP addresses of the clients originating the incoming traffic.

2. The method of claim 1, further comprising:
monitoring at least a processing load of the ADC cluster;
adding at least one VA to the ADC cluster when the processing load exceeds a first threshold, wherein the first threshold indicates a peak processing load for the ADC cluster; and
removing at least one VA from the ADC cluster when the processing load is below a second threshold, wherein the second threshold indicates a low processing load for the ADC cluster.

3. The method of claim 2, wherein each of adding at least one VA from the ADC cluster and removing at least one VA from the ADC cluster further comprising:
updating the hash table to accommodate a new number of active VAs in the ADC cluster.

4. The method of claim 3, wherein a first group of active VAs are allocated with a first number of buckets and a second group of VAs are allocated with a second number of buckets, wherein the first number of buckets allocated for each active VA in the first group is computed as the number of buckets in the hash table divided by the number of active VAs, truncated to a closest integer number; and wherein the second number of buckets allocated for each active VA in the second group is computed as the number of buckets in the hash table divided by the number of active VAs, truncated to a closest integer number plus one.

5. The method of claim 4, wherein updating the number of buckets in the hash table further comprising:
first transferring at least one bucket allocated for each active VA in the second group to the newly added VA; and
transferring at least one bucket allocated for each active VA in the first group to the newly added VA, only when the number of buckets allocated to the new VA has not reached the first number, thereby minimizing the changes to the buckets allocation in the hash table.

6. The method of claim 5, wherein updating the number of buckets in the hash table further comprising:
first transferring buckets allocated to the removed VA to active VAs in the first group, wherein each VA in the first group is allocated with one bucket; and
transferring remaining buckets, allocated to the removed VA, to active VAs in the second group, wherein each VA in the second group is allocated with one bucket, thereby minimizing the changes to the buckets allocation in the hash table.

7. The method of claim 3, wherein the plurality of VAs are configured with different capacities and the allocation of buckets is proportional to the capacity of each active VA.

8. The method of claim 3, wherein the number of buckets in the hash table is a function of the number of the plurality of VAs.

9. The method of claim 3, further comprising:
programming each VA affected by changes to the ADC cluster with at least one persistency rule, thereby ensuring persistency in the processing of incoming and outgoing traffic by each of the affected VAs.

10. The method of claim 1, wherein programming the at least one network element further comprising:
providing the least one network element with an instruction including at least a matching rule and an action rule, wherein the matching rule requires matching of a predefined number of lowest bits of the client's SIP address of an incoming packet against the hash function to find a bucket associated with the SIP address and a VA designated for the bucket; and wherein the action rule requires forwarding the incoming packet to the designated VA.

11. The method of claim 10, further comprising:
programming at least one egress network element connected to the ADC cluster to direct an outgoing packet to a VA forwarded a respective incoming packet of the incoming traffic, wherein the outgoing packet is received from the server.

12. The method of claim 11, wherein programming the at least one egress network element further comprising:
providing the least one egress network element with an instruction including a matching rule and an action rule, wherein the matching rule requires matching of a predefined number of lowest bits of a destination IP address of the outgoing packet against the hash table to find a bucket associated with the destination IP address and a VA designated for the bucket; and wherein the action rule requires forwarding the outgoing packet to the designated VA.

13. The method of claim 11, wherein the central controller communicates with the least one ingress network element and at least one egress network element over an OpenFlow provisional protocol.

14. The method of claim 1, further comprising:
monitoring an operational status of each of the plurality of VAs in the ADC cluster; and
changing a configuration of the ADC cluster by adding or removing one or more VAs in response to the monitored operational status.

15. A non-transitory computer readable medium containing instructions that when executed on the central controller performs the method of claim 1.

16. A method for managing an application delivery controller (ADC) cluster including a plurality of ADC devices and operable in a software defined networking (SDN)-based network, wherein the method is performed by a central controller of the SDN-based network, comprising:
  creating, by the central controller, a hash table including a plurality of buckets allocated for the plurality of ADC devices, wherein each of the buckets is assigned for a range of source internet protocol (IP) addresses of a client;
  monitoring at least one of a processing load of the ADC cluster and an operation status of each of the ADC devices;
  causing reconfiguration of the ADC cluster in response to the monitoring, wherein the reconfiguration of the ADC cluster includes at least one of: adding one of the ADC devices, removing one of the ADC devices, and updating the hash table; and programming by the central controller at least one ingress network element connected to the ADC cluster to perform balanced traffic distribution among the plurality of ADC devices, wherein the traffic distribution is based in part on the allocation of the buckets to the plurality of ADC devices and source IP addresses of clients originating the traffic.

17. The method of claim 16, wherein each of adding one of the ADC devices and removing one of the ADC devices further comprising:
updating the hash table to accommodate for a new number of active ADC devices in the ADC cluster.

18. The method of claim 17, wherein a first group of active ADC devices are allocated with a first number of buckets and a second group of active ADC devices are allocated with a second number of buckets, wherein the first number of buckets allocated for each active ADC device in the first group is computed as the number of buckets in the hash table divided by the number of active ADC devices, truncated to a closest integer number; and wherein the second number of buckets allocated for each active ADC device in the second group is computed as the number of buckets in the hash table divided by the number of active ADC devices, truncated to a closest integer number plus one.

19. The method of claim 18, wherein updating the number of buckets in the hash table further comprising:
first transferring at least one bucket allocated for each active ADC device in the second group to the new added ADC device; and
transferring at least one bucket allocated for each active ADC device in the first group to a newly added ADC device, only when the number of buckets allocated to the newly ADC device has not reached the first number, thereby minimizing the changes to the buckets allocation in the hash table.

20. The method of claim 19, wherein updating the number of buckets in the hash table further comprising:
first transferring buckets allocated to the removed ADC device to active ADC devices in the first group, wherein each ADC device in the first group is allocated with one bucket; and
transferring remaining buckets, allocated to the removed ADC device, to active ADC devices in the second group, wherein each ADC device in the second group is allocated with one bucket, thereby minimizing the changes to the buckets allocation in the hash table.

21. The method of claim 17, wherein the plurality of ADC devices are configured with different capacities and the allocation of buckets is proportional to the capacity of each active VA.

22. The method of claim 17, further comprising:
programming each ADC device affected by changes to the ADC cluster with at least one persistency rule, thereby ensuring persistency in the processing of incoming and outgoing traffic by each of the affected ADC devices.

23. A central controller for managing an application delivery controller (ADC) cluster in a software defined networking (SDN)-based network, the ADC cluster includes a plurality of physical devices, each of the plurality of physical devices includes a plurality of ADC virtual appliances (VAs), comprising:
a processing unit; and
a memory, the memory containing instructions that, when executed by the processing unit, configures the central controller to:
create a hash table including a plurality of buckets allocated to active VAs out of the plurality of VAs, wherein each of the buckets is assigned to a range of a source internet protocol (IP) addresses of a client; and
program at least one ingress network element, connected to the ADC cluster and configured to receive incoming traffic from clients, to perform a balanced incoming traffic distribution among the plurality of VAs, wherein the traffic distribution is based in part on the allocation of the buckets to the plurality of VAs and the source IP addresses of the clients originating the incoming traffic.

24. The central controller of claim 23, wherein the central controller is further configured to:
monitor at least a processing load of the ADC cluster;
add at least one VA to the ADC cluster when the processing load exceeds a first threshold, wherein the first threshold indicates a peak processing load for the ADC cluster;
remove at least one VA from the ADC cluster when the processing load is below a second threshold, wherein the second threshold indicates a low processing load for the ADC cluster; and
update the hash table to accommodate for a new number of active VAs in the ADC cluster.

25. The central controller of claim 24, wherein the plurality of ADC devices are configured with different capacities and the allocation of buckets is proportional to the capacity of each active VA.

26. The central controller of claim 24, wherein the central controller is further configured to:
program each VA affected by changes to the ADC cluster with at least one persistency rule, thereby ensuring persistency in the processing of incoming and outgoing traffic by each of the affected VAs.

* * * * *